United States Patent
Perilli

(10) Patent No.: US 10,778,701 B2
(45) Date of Patent: Sep. 15, 2020

(54) MITIGATING CYBER-ATTACKS BY AUTOMATICALLY COORDINATING RESPONSES FROM CYBER-SECURITY TOOLS

(71) Applicant: Red Hat, Inc., Raleigh, NC (US)

(72) Inventor: Alessandro Perilli, London (GB)

(73) Assignee: Red Hat, Inc., Raleigh, NC (US)

( * ) Notice: Subject to any disclaimer, the term of this patent is extended or adjusted under 35 U.S.C. 154(b) by 325 days.

(21) Appl. No.: 15/949,264

(22) Filed: Apr. 10, 2018

(65) Prior Publication Data

US 2019/0312890 A1 Oct. 10, 2019

(51) Int. Cl.
*H04L 29/06* (2006.01)
*G06N 20/00* (2019.01)

(52) U.S. Cl.
CPC ......... *H04L 63/1416* (2013.01); *G06N 20/00* (2019.01); *H04L 63/1441* (2013.01)

(58) Field of Classification Search
CPC ............. H04L 63/1416; H04L 63/1441; H04L 63/0263; H04L 63/145; H04L 63/0236; G06N 20/00
See application file for complete search history.

(56) References Cited

U.S. PATENT DOCUMENTS

| | | | |
|---|---|---|---|
| 7,930,256 B2 | 4/2011 | Gonsalves et al. | |
| 9,258,321 B2 * | 2/2016 | Amsler | H04L 63/20 |
| 10,129,290 B2 * | 11/2018 | Thomas | H04L 63/0272 |
| 2011/0264608 A1 * | 10/2011 | Gonsalves | G06N 7/005 |
| | | | 706/10 |
| 2011/0289588 A1 | 11/2011 | Sahai et al. | |

(Continued)

FOREIGN PATENT DOCUMENTS

| | | |
|---|---|---|
| EP | 3145149 A1 | 3/2017 |
| WO | 2017/007480 A1 | 1/2017 |

OTHER PUBLICATIONS

Li et al., "Autonomous Security Decision Management Based on Multilayer Agent", Proceedings of the 2009 International Workshop on Information Security and Application (IWISA 2009), ISBN 978-952-5726-06-0, Published Nov. 2009 (Year: 2009).*

(Continued)

*Primary Examiner* — Chau Le
(74) *Attorney, Agent, or Firm* — Kilpatrick Townsend & Stockton LLP

(57) ABSTRACT

Cyber-attacks can be mitigated by automatically coordinating responses from cyber-security tools. For example, a cyber-security engine can include software modules created by multiple sources, each of the software modules being for integrating a respective cyber-security tool with the cyber-security engine. The cyber-security engine can use the software modules to communicate with the cyber-security tools in order to detect one or more events indicative of a cyber-attack against a computing environment. The cyber-security engine can then determine a coordinated-response strategy involving cooperation among the cyber-security tools to mitigate the cyber-attack. The cyber-security engine can transmit commands to the cyber-security tools to cause the cyber-security tools to implement the coordinated-response strategy.

20 Claims, 4 Drawing Sheets

(56) References Cited

U.S. PATENT DOCUMENTS

2012/0096549 A1* 4/2012 Amini ................ H04L 63/1433
726/23
2013/0104236 A1* 4/2013 Ray ..................... H04L 63/1433
726/25
2016/0269378 A1 9/2016 Ye

OTHER PUBLICATIONS

Broughton, K., "The Need to Integrate Cybersecurity Tools," Integrations, 2017, https://swimlane.com/cyber-security-tools/.

Dilek, S. et al., "Applications of Artifical Intelligence Techniques to Combating Cyber Crimes: A Review," Department of Computer Engineering, Graduate School of Natural and Applied Sciences, Gazi University, Ankara, Turkey; Department of Computer and Educational Technologies, Faculty of Education, Gazi University Ankara, Turkey; Cyber Defence and Security Center, Informatics Institute, Middle East Technical University, Ankara, Turkey, Jan. 1, 2015 https://arxiv.orc/ftp/arxiv/papers/1502/1502 03552.pdf.

"Artificial Intelligence as a tool to Defend against Cyber Attacks," CIOReview, Jan. 15, 2018, https://artificial-intelligence.cioreview.com/news/artificial-intelliqence-as-a-tool-to-defend-against-cyber-attacks-nid-25483-cid-175.html.

"Security Operations Accelerated," 2017, http://jask.al/wp-content/uploads/2017/11/JASK Security Operations Accelerated REV.pdf.

* cited by examiner

US 10,778,701 B2

MITIGATING CYBER-ATTACKS BY AUTOMATICALLY COORDINATING RESPONSES FROM CYBER-SECURITY TOOLS

TECHNICAL FIELD

The present disclosure relates generally to information security and intrusion detection. More specifically, but not by way of limitation, this disclosure relates to mitigating cyber-attacks by automatically coordinating responses from cyber-security tools.

BACKGROUND

Cyber-attacks are an ever increasing problem in today's digitally connected world. Cyber-attacks can take on a variety of forms, such as denial of service (DoS) attacks; attacks involving viruses, Trojans, worms, or ransomware; and intrusion attempts. To combat cyber-attacks, organizations typically employ a large number of hardware- and software-based cyber-security tools (e.g., firewalls, intrusion detection systems, antivirus software, or any combination of these). For example, a single organization may employ 10-20 different cyber-security tools to mitigate (e.g., prevent) cyber-attacks.

DETAILED DESCRIPTION

Figure 1:
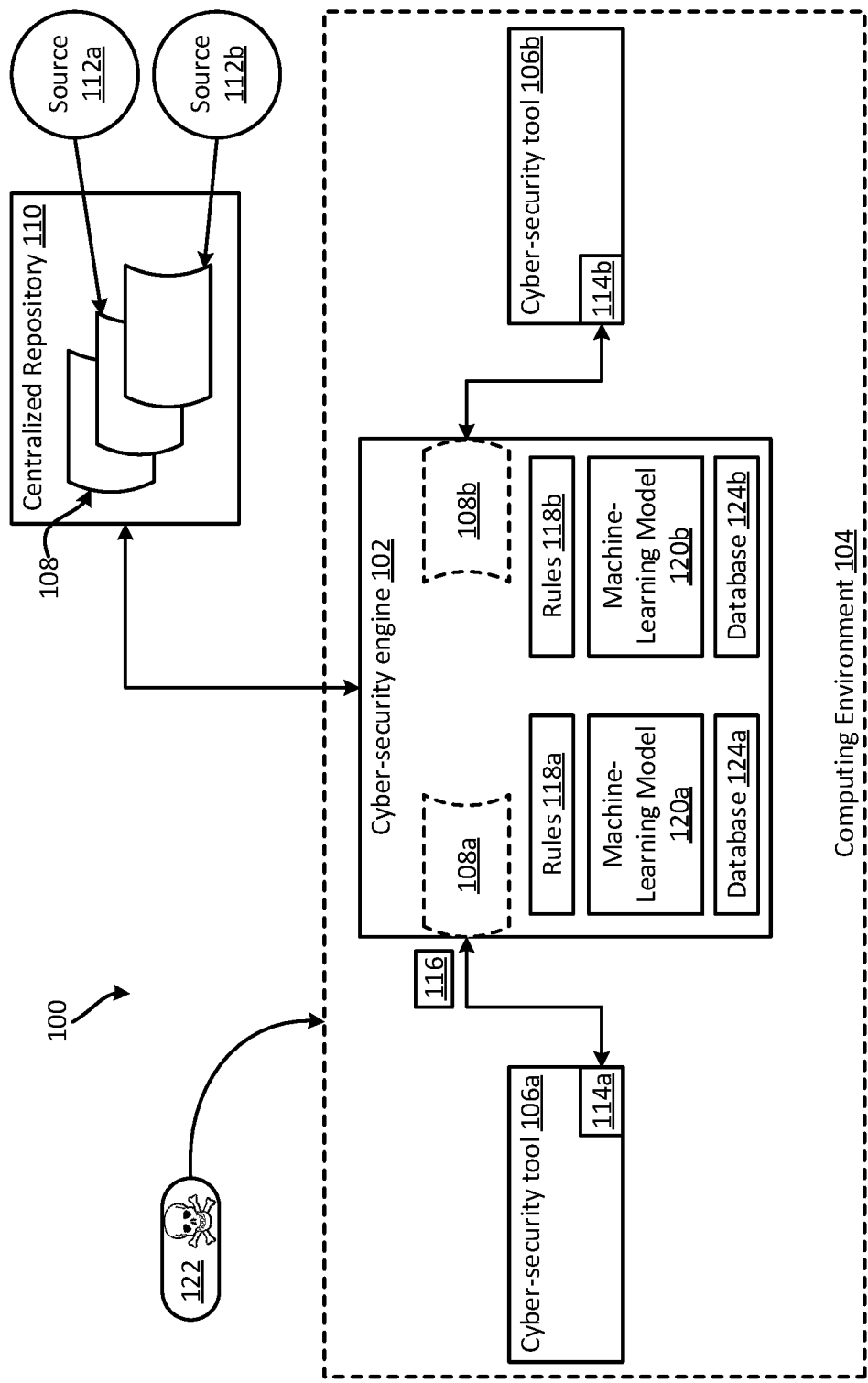
FIG. 1 is a block diagram of an example of a system for mitigating cyber-attacks by automatically coordinating responses from cyber-security tools according to some aspects.

A typical computer system will employ several, independent cyber-security tools that can detect a cyber-attack and attempt to implement responses to the cyber-attack independently of one another. This can create a variety of problems. For example, the cyber-security tools may attempt to respond to the cyber-attack in conflicting ways, which can may reduce the effectiveness of some or all of the responses. Alternatively, the cyber-security tools may attempt to respond to the cyber-attack in the same way, which can result in duplication of efforts that unnecessarily consumes computing resources (e.g., RAM and processing cycles). Also, each cyber-security tool will only have limited information about a particular aspect of the cyber-attack, rather than "big picture" information about the cyber-attack as a whole. This can result in the cyber-security tool implementing an inadequate (e.g., partial) response that fails to appreciate the scope and complexity of the cyber-attack. Further, typical cyber-security tools are static and require frequent updates to detect ever-evolving cyber-attacks. But ensuring that all of an organization's cyber-security tools are constantly up-to-date is a time consuming, expensive, and challenging process.

Some examples of the present disclosure can overcome one or more of the abovementioned issues by providing a cyber-security engine that can automatically (i) interface with various cyber-security tools to detect one or more events indicative of a cyber-attack; (ii) determine a coordinated-response strategy to mitigate the cyber-attack; and (iii) implement the coordinated-response strategy by controlling and managing responses from one or more cyber-security tools. This can help prevent the cyber-security tools from implementing conflicting, duplicate, or incomplete responses to the cyber-attack. In some examples, the cyber-security engine can also communicate with other cyber-security engines (e.g., in other networks) to automatically (i) identify various response strategies that have previously been implemented to mitigate a particular type of cyber-attack; (ii) compare the various response strategies to determine which of the response strategies was the "best" according to one or more predefined criteria; and (iii) configure itself to respond to a similar type of cyber-attack using the best response-strategy. This process can be repeatedly performed to help ensure that the cyber-security engine implements the best response to evolving cyber-attacks. In some examples, the cyber-security engine can include a machine-learning model for analyzing a cyber-attack and determining a holistic response strategy. The machine-learning model may evolve ("learn") over time to enable the cyber-security engine to detect and mitigate new types of cyber-attacks.

As a particular example, a hacker may attempt to transmit a virus through an open port (e.g., port 8080) in an organization's network. The network may have antivirus software that detects the virus and transmits an alert to the cyber-security engine. The cyber-security engine can receive the alert and communicate with various other cyber-security tools (e.g., an intrusion detection system) to determine more information about the virus. Through this process, the cyber-security engine may determine that the virus was transmitted from an unknown source through port 8080. The cyber-security engine can then determine a coordinated-response strategy, for example, closing the open port and erasing the virus. Finally, the cyber-security engine can implement the coordinated-response strategy by instructing a firewall to close the open port and the antivirus software to erase the virus. In this manner, the cyber-security engine can provide a more complete, holistic response to the cyber-attack than the antivirus software could implement alone. For example, by itself, the antivirus software would only erase the virus, without closing the open port. This could leave the network vulnerable to additional cyber-attacks by the hacker.

In the example discussed above, the cyber-security engine may determine the coordinated-response strategy by communicating with other cyber-security engines in other networks (e.g., for other organizations). The cyber-security engine can communicate with the other cyber-security engines to determine how they have responded to similar types of cyber-attacks in the past. For example, the cyber-security engine can determine that one cyber-security engine responded to a similar type of cyber-attack by (i) analyzing data-packet logs to determine which data packets are associated with the virus, (ii) determining that those data packets originated from an IP address that is unknown to the cyber-security engine, (iii) instructing a firewall to filter data-packets from the IP address on port 8080, and (iv) instructing the antivirus software to erase the virus. The cyber-security engine can also determine that another cybersecurity engine responded to a similar type of cyber-attack by (i) instructing a firewall to close port 8080, and (ii) instructing the antivirus software to erase the virus. The cyber-security engine can then compare one or more characteristics of the responses. These characteristics can be referred to as response characteristics. For example, the cyber-security engine can determine that the two-step response takes significantly less processing power, memory, and time to implement than the four-step response. So, the cyber-security engine can select the two-step response as the coordinated-response strategy.

In some examples, the cyber-security engine can select a coordinated-response strategy for a cyber-attack based at least in part on the characteristics of the computing environment (e.g., computer, network, or both) that the cyber-security engine is defending. These characteristics can be referred to as computing-environment characteristics. For example, the cyber-security engine can determine that no services in the computing environment are using port 8080, so port 8080 can be closed without negatively affecting any services. Based on this determination, the cyber-security engine can select the two-step response over the four-step response (discussed above). Alternatively, the cyber-security engine can determine that the computing environment has a service that is using port 8080, so port 8080 cannot be closed without negatively affecting the service. Based on this determination, the cyber-security engine can select the four-step response over the two-step response.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system 100 for mitigating cyber-attacks by automatically coordinating responses from cyber-security tools 106*a*-*b* according to some aspects. The system 100 includes a cyber-security engine 102, which can serve as a centralized medium for communicating with and controlling any number and combination of cyber-security tools 106*a*-*b*. The cyber-security engine 102 can be a software application executing on one or more computing devices in a computing environment 104 for defending against a cyber-attack 122.

The cyber-security engine 102 can integrate with the cyber-security tools 106*a*-*b* through software modules 108*a*-*b*. A software module can be a self-contained, installable module with computer-executable program code for enabling the cyber-security engine 102 to integrate with a particular cyber-security tool. The software modules 108*a*-*b* can be produced by various sources 112*a*-*b*, such as different companies or organizations. For example, a company that makes the cyber-security tool 106*a* can create the software module 108*a* to enable the cyber-security tool 106*a* to be integrated with the cyber-security engine 102. And another company that makes another cyber-security tool 106*b* can create the software module 108*b* to enable the other cyber-security tool 106*b* to be integrated with the cyber-security engine 102. By having various sources create the software modules 108*a*-*b* (e.g., as opposed to having a single entity create all of the software modules 108*a*-*b*), better and faster integration with a large number of cyber-security tools can be achieved.

In some examples, the software modules 108*a*-*b* can be open source and programmed using the same programming language (e.g., an automation language, like Ansible™). This can enable a community of developers to quickly and easily create, update, and debug the software modules 108*a*-*b*, thereby improving the number and quality of the software modules 108 available. The software modules 108 may be stored in a centralized repository 110 (e.g., GitHub™), from which they can be downloaded (e.g., via the Internet) and installed for use by cyber-security engine 102.

The software modules 108*a*-*b* can interface with application programming interfaces (APIs) 114*a*-*b* of the cyber-security tools 106*a*-*b*. The APIs can enable information to be communicated (e.g., bidirectionally) between the cyber-security tools 106*a*-*b* and the software modules 108*a*-*b*. Each cyber-security tool can have an API for integrating with the cyber-security engine 102. For example, the cyber-security tool 106*a* can have a Representational State Transfer (REST) API through which the cyber-security engine 102 can control the cyber-security tool 106 using REST commands.

The software modules 108*a*-*b* can translate commands and data between formats to enable the cyber-security engine 102 to communicate with the cyber-security tools 106*a*-*b*. For example, the cyber-security tool 106*a* may accept commands in a REST format and provide data in an extensible markup language (XML) format. And the cyber-security tool 106*b* may accept commands in a proprietary format and provide data in JavaScript Object Notation (JSON) format. But the cyber-security engine 102 may only be able to transmit commands in a C++ syntax and digest data in a comma-separated format. So, the software modules 108*a*-*b* can convert data transmitted by the cyber-security tools 106*a*-*b* from XML and JSON, respectively, into the comma-separated format digestible by the cyber-security engine 102. And the software modules 108*a*-*b* can convert commands from the cyber-security engine 102 into the REST format and the proprietary format, respectively, for use by the cyber-security tools 106*a*-*b*. In some examples, the software modules 108*a*-*b* can include an algorithm or lookup table for translating commands and data between formats. For example, the software module 108*a* can include a lookup table that correlates commands from the cyber-security engine 102 into REST commands for use by the cyber-security tool 106*a*. And the other software module 108*b* can include a lookup table that correlates commands from the cyber-security engine 102 into proprietary commands for use by the other cyber-security tool 106*b*.

In some examples, the cyber-security engine 102 can use the software modules 108*a*-*b* to communicate with the cyber-security tools 106*a*-*b* in order to detect a cyber-attack 122. More specifically, the cyber-security engine 102 can receive and process data from the cyber-security tools 106*a*-*b* to identify one or more events indicative of a cyber-attack 122. Examples of events can include (i) network events, such as high bandwidth, connections from unknown or untrusted sources, improperly formed datapackets, or port scans; (ii) file events, such as copying, deleting, modifying, or locking files; (iii) administrative events, such as creating a user account, deleting a user account, or modifying privileges for a user account; (iv) computer-resource events, such as high processing-power consumption, high memory consumption, or high energy consumption; (v) error events, such as a buffer overflow or a suspicious number of incorrect authentication attempts; or (vi) any combination of these. As a particular example, the cyber-security tool 106*a* can transmit a notification to the cyber-security engine 102 indicating that bandwidth consumption is unusually high (e.g., higher than an average amount of bandwidth consumption by a threshold amount). And the other cyber-security tool 106*b* can transmit a notification to the cyber-security engine 102 indicating that an unusual pattern of copying files has been detected. Individually, these notifications may seem generally innocuous. But the cyber-security engine 102 can determine that the combination of these events may signal a cyber-attack, such as a hacker downloading a large volume of critical files from the computing environment 104.

The cyber-security engine 102 can detect a cyber-attack 122 using any number and combination of techniques. In some examples, the cyber-security engine 102 can detect a cyber-attack 122 using a database 124*a*. The database 124*a* can be constructed by a cyber-security professional, a system administrator, or another entity. In one example, the database 124*a* can include relationships between events that are detectable by various cyber-security tools 106*a-b* and cyber-attacks. In another example, the database 124*a* can include relationships between events that are detectable by various cyber-security tools 106*a-b* and scores. The cyber-security engine 102 may detect a cyber-attack 122 if multiple events have an aggregate score that surpasses a predefined threshold. For example, the scores may range between 1 and 100, with higher scores being more indicative of a cyber-attack. An event involving unusually high bandwidth consumption can have a score of 30. An event involving an unusual pattern of copying files can have a score of 40. The aggregate value of these scores is 30+40=70, which may surpass a predefined threshold of 65 that is associated with a cyber-attack. Based on the aggregate value surpassing 65, the cyber-security engine 102 can determine that a cyber-attack is occurring or has occurred.

In some examples, the cyber-security engine 102 can detect a cyber-attack 122 using rules 118*a*. The rules 118*a* can include conditional statements (e.g., IF, THEN, ELSE statements) or otherwise express an ordered series of events that is associated with a cyber-attack 122. The cyber-security engine 102 can digest the rules 118*a* and process data from the cyber-security tools 106*a-b* to identify the ordered series of events associated with the cyber-attack 122. In some examples, the cyber-security engine 102 may construct the rules 118*a* by analyzing logs of prior cyber-attacks and finding correlations between various events and the cyber-attacks. Additionally or alternatively, the rules 118*a* can be constructed by a cyber-security professional, a system administrator, or another entity.

In some examples, the cyber-security engine 102 can detect a cyber-attack 122 using a machine-learning model 120*a*. Examples of the machine-learning model 120*a* can include a neural network, decision tree, classifier, or any combination of these. The machine-learning model 120*a* can be trained to determine correlations between various events and a cyber-attack 122. For example, the machine-learning model 120*a* can be trained using training data that includes thousands or millions of relationships cyber-attacks and between various events detectable by the cyber-security tools 106*a-b*. The training data can be supplied as input to the machine-learning model 120*a*, which can tune various weights (e.g., node weights) based on the training data. This process can be iterated until the machine-learning model 120*a* is capable of identifying a cyber-attack with an acceptable level of accuracy (e.g., 95% correct). After the machine-learning model 120*a* has been trained, the cyber-security engine 102 can receive information about various events from the cyber-security tools 106*a-b*, feed the information into the machine-learning model 120*a*, and receive as output an indication of whether or not the events indicate a cyber-attack 122.

After detecting a cyber-attack 122, the cyber-security engine 102 can determine a coordinated-response strategy to mitigate the cyber-attack 122. A coordinated-response strategy can involve at least two cyber-security tools 106*a-b* performing operations that are collectively configured to mitigate a single cyber-attack 122. These operations can be referred to as mitigation operations. Examples of mitigation operations can include (i) modifying, deleting, or quarantining problematic software, such as a virus, Trojan, worm, or ransomware; (ii) closing or opening a port; (iii) closing or opening a network connection; (iv) creating, deleting, or modifying a file; (v) creating a user account, deleting a user account, or modifying privileges for a user account; (vi) quarantining a portion of memory or a filesystem; (vii) applying an update or patch; (viii) changing a setting; or (ix) any combination of these.

The cyber-security engine 102 can determine the coordinated-response strategy based on one or more characteristics of the cyber-attack 122, which can be referred to as cyber-attack characteristics. Examples of cyber-attack characteristics can include (i) a source of the cyber-attack; (ii) a type of the cyber-attack; (iii) program code or a file associated with the cyber-attack; (iv) a time and date of the cyber-attack; (v) steps or actions implemented to carry out the cyber-attack; or (vi) any combination of these.

The cyber-security engine 102 can determine a coordinated-response strategy using any number and combination of techniques. In some examples, the cyber-security engine 102 can determine a coordinated-response strategy using a database 124*b*. The database 124*b* can be constructed by a cyber-security professional, a system administrator, or another entity. The database 124*b* can include relationships between cyber-attack characteristics and coordinated-response strategies. For example, the database 124*b* can include various types of cyber-attacks, with each type of cyber-attack being correlated to at least one coordinated-response strategy. In some examples, each type of cyber-attack can be correlated to multiple different coordinated-response strategies, from which the cyber-security engine 102 can select a preferred coordinated-response strategy based on the circumstances (e.g., the computing-environment characteristics; the cyber-attack characteristics, such as the type of the cyber-attack 122 or the severity of the cyber-attack; or any combination of these).

In some examples, the cyber-security engine 102 can determine a coordinated-response strategy using rules 118*b*. The rules 118*a* can include conditional statements or otherwise express an ordered series of steps for determining a coordinated-response strategy. The cyber-security engine 102 can digest and apply the rules 118*b* to the circumstances to determine the appropriate coordinated-response strategy. In some examples, the cyber-security engine 102 may construct the rules 118*b* by analyzing logs of prior cyber-attacks and response strategies used to mitigate the prior cyber-attacks. Additionally or alternatively, the rules 118*b* can be constructed by a cyber-security professional, a system administrator, or another entity.

In some examples, the cyber-security engine 102 can determine a coordinated-response strategy using a machine-learning model 120*b*. The machine-learning model 120*b* can be trained to select among candidate coordinated-response strategies based on the circumstances. For example, the machine-learning model 120*a* can be trained using training data that includes thousands or millions of relationships between cyber-attack characteristics and coordinated-response strategies. The training data can be supplied as input to the machine-learning model 120b, which can tune various weights based on the training data. This process can be iterated until the machine-learning model 120b is capable of identifying a preferred coordinated-response strategy with an acceptable level of accuracy (e.g., 95% correct). As another example, each piece of training data can include a relationship between (i) a computing-environment characteristic, (ii) a cyber-attack characteristic, and (iii) preferred coordinated-response strategy. The machine-learning model 120b can then be trained using this more-complex training data. After the machine-learning model 120b has been trained, the cyber-security engine 102 can determine one or more cyber-attack characteristics (and, in some examples, one or more computing-environment characteristics), feed the characteristics into the machine-learning model 120b, and receive as output a coordinated-response strategy for mitigating the cyber-attack 122.

In one example in which there is little or no training data available, the cyber-security engine 102 can use the machine-learning model 120b to analyze cyber-attack characteristics and select a candidate response-strategy for mitigating the cyber-attack. The cyber-security engine 102 can then present the candidate response-strategy to a user via a display device (e.g., a liquid crystal display). The cyber-security engine 102 can receive user input via a user input device (e.g., a mouse, keyboard, or touchscreen) indicating whether the candidate response-strategy is acceptable or unacceptable to the user. Based on the user input, the cyber-security engine 102 can configure the machine-learning model 120b to improve accuracy. For example, the cyber-security engine 103 can configure one or more parameters of the machine-learning model 120b based on the user input. In some examples, if the user input indicates that the candidate response-strategy is unacceptable, the machine-learning model 120b can select and present an alternative candidate response-strategy to the user. This process can be repeated until the machine-learning model 120b identifies an acceptable response-strategy. The machine-learning model 120b can then be configured to correlate the cyber-attack characteristics with the acceptable response-strategy. The above process can be iterated for a wide variety of cyber-attack characteristics and response strategies to teach the machine-learning model 120b how to select an appropriate coordinated-response strategy for the circumstances.

Next, the cyber-security engine 102 can cause the coordinated-response strategy to be implemented. For example, the cyber-security engine 102 can transmit commands to the cyber-security tools 106a-b to cause the cyber-security tools 106a-b to implement respective portions of the coordinated-response strategy. For example, the cyber-security engine 102 can transmit a command 116 to cyber-security tool 106a to cause cyber-security tool 106a to close a port, close a network connection, quarantine a portion of memory (e.g., RAM or a hard disk), or erase a file.

The components shown in FIG. 1 are exemplary, and other examples can include more components, fewer components, different components, or a different combination of the components shown in FIG. 1. For example, although FIG. 1 shows two separate sets of rules 118a-b, these may be combined into a single set of rules. As another example, although FIG. 1 shows two separate machine-learning models 120a-b, these may be combined into a single machine-learning model (e.g., capable of performing the functionality of both of the machine-learning models 120a-b). As still another example, although FIG. 1 shows two separate databases 124a-b, these may be combined into a single database. Further, the system 100 can include any number and combination of cyber-security tools for defending against any number and combination of cyber-attacks. And the cyber-security engine 102 can include any number and combination of software modules, created by any number and combination of sources, for integrating with the cyber-security tools.

Figure 2:
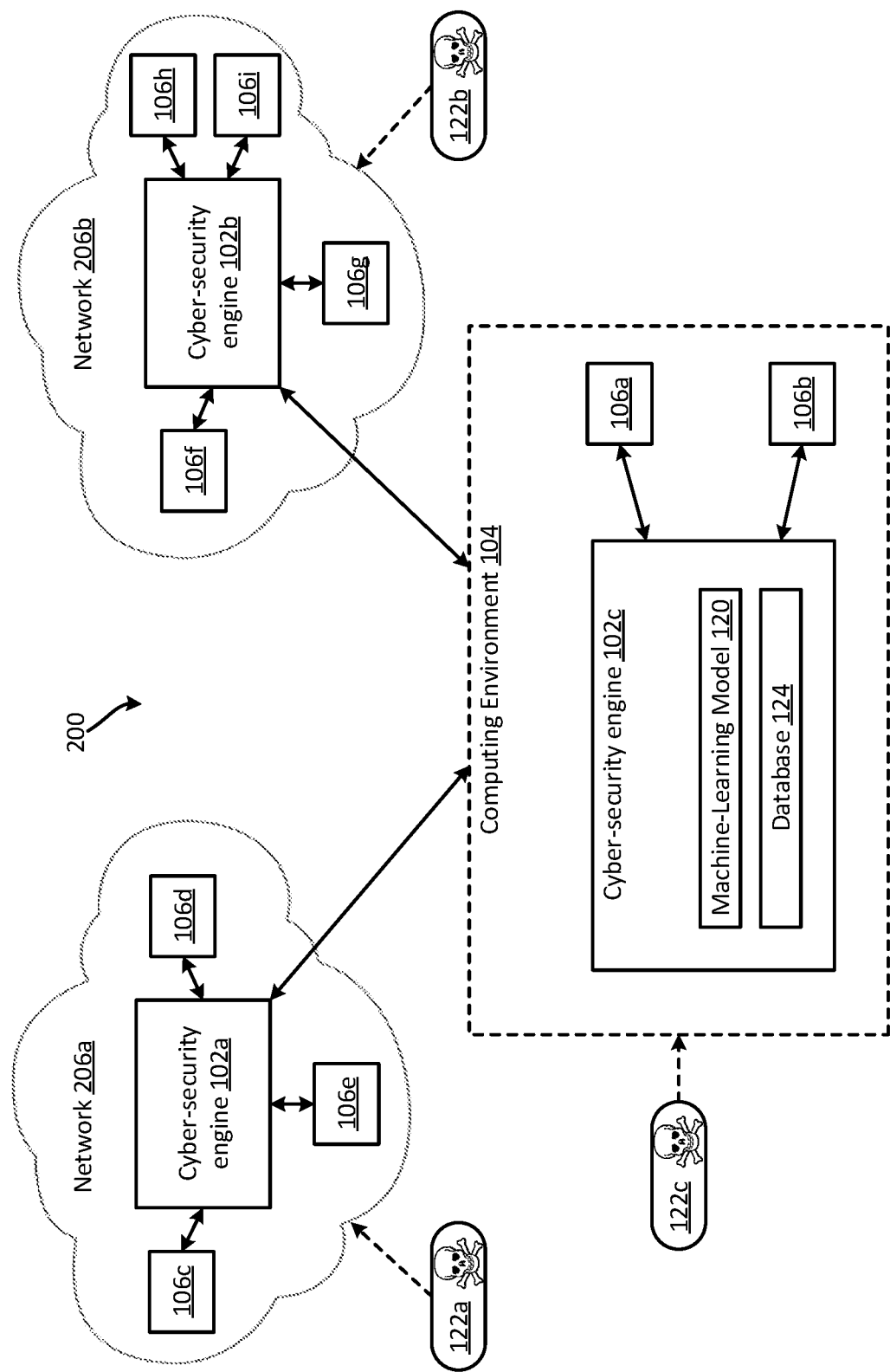
FIG. 2 is a block diagram of another example of a system for mitigating cyber-attacks by automatically coordinating responses from cyber-security tools according to some aspects.

FIG. 2 is a block diagram of another example of a system 200 for mitigating cyber-attacks by automatically coordinating responses from cyber-security tools 106a-i according to some aspects. The system 200 includes a network 206a being protected by a cyber-security engine 102a, another network 206b being protected by another cyber-security engine 102b, and a computing environment 104 being protected by yet another cyber-security engine 102c. In some examples, the computing environment 104 is a network that is different from the other networks 206a-b.

The cyber-security engines 102a-c can communicate with one another to share information about cyber-attacks 122a-c, responses to the cyber-attacks 122a-c, or both. For example, cyber-security engine 102a can transmit information about a new type of cyber-attack 122a, a coordinated-response strategy for mitigating the new type of cyber-attack 122a, or both to the other cyber-security engine 102c. The cyber-security engine 102c can then configure itself to defend against the new type of cyber-attack 122a based on the information. For example, cyber-security engine 102c can add the information to the database 124. Additionally or alternatively, the cyber-security engine 102c can train the machine-learning model 120 using the information. Sharing this information among the cyber-security engines 102a-c can help them help combat new or evolving cyber-attacks.

In some examples, the cyber-security engine 102c can determine and compare how the other cyber-security engines 102a-c responded to a particular type of cyber-attack. For example, the cyber-security engine 102a may have responded to a particular type of cyber-attack 122a using one coordinated-response strategy. And the other cyber-security engine 102b may have responded to the same type of cyber-attack 122b using another coordinated-response strategy. The cyber-security engine 102c can communicate with the other cyber-security engines 102a-b to determine the two coordinated-response strategies.

After determining the two coordinated-response strategies, the cyber-security engine 102c can compare response characteristics of the coordinated-response strategies to determine which coordinated-response strategy is superior. Examples of the response characteristics can be (i) the amount of time required to implement the coordinated-response strategy, (ii) the amount of processing power, memory, or electrical energy required to implement the coordinated-response strategy; (iii) the effectiveness of the coordinated-response strategy; (iv) the hardware or software required to implement the coordinated-response strategy; or (v) any combination of these. The cyber-security engine 102c can determine that one coordinated-response strategy is superior to another based on the circumstances, such as the computing-environment characteristics, the cyber-attack characteristics, the response characteristics, or any combination of these. For example, the cyber-security engine 102c can compare the amount of time required to implement each coordinated-response strategy and determine that the faster of the two is superior. As another example, the cyber-security engine 102c can compare the amount of RAM required to implement each coordinated-response strategy and determine that the more memory-efficient of the two is superior. As another example, the cyber-security engine 102c can determine that one of the coordinated-response strategies requires particular software in order to be implemented. And the computing environment 104 may lack the particular software. So, the cyber-security engine 102c can determine that the other coordinated-response strategy is superior. The cyber-security engine 102c can use any number and combination of criteria (e.g., predefined or dynamic) to determine which coordinated-response strategy is superior.

In some examples, the cyber-security engine 102c can configure itself to use the superior coordinated-response strategy to respond to the same type of cyber-attack 122c. For example, the cyber-security engine 102c can include a machine-learning model 120. The machine-learning model 120 can be trained to select the superior coordinated-response strategy for use in responding to the cyber-attack 122c. As another example, the cyber-security engine 102c can configure a database 124 to correlate the superior coordinated-response strategy with the cyber-attack 122c. Then, if the same type of cyber-attack 122c is launched against the computing environment 104, the cyber-security engine 102c can select and use the superior coordinated-response strategy to mitigate the cyber-attack 122c.

The components shown in FIG. 2 are exemplary, and other examples can include more components, fewer components, different components, or a different combination of the components shown in FIG. 2. For example, the cyber-security engine 102c can communicate with any number and combination of other cyber-security engines, spread out across any number and combination of computing environments.

Figure 3:
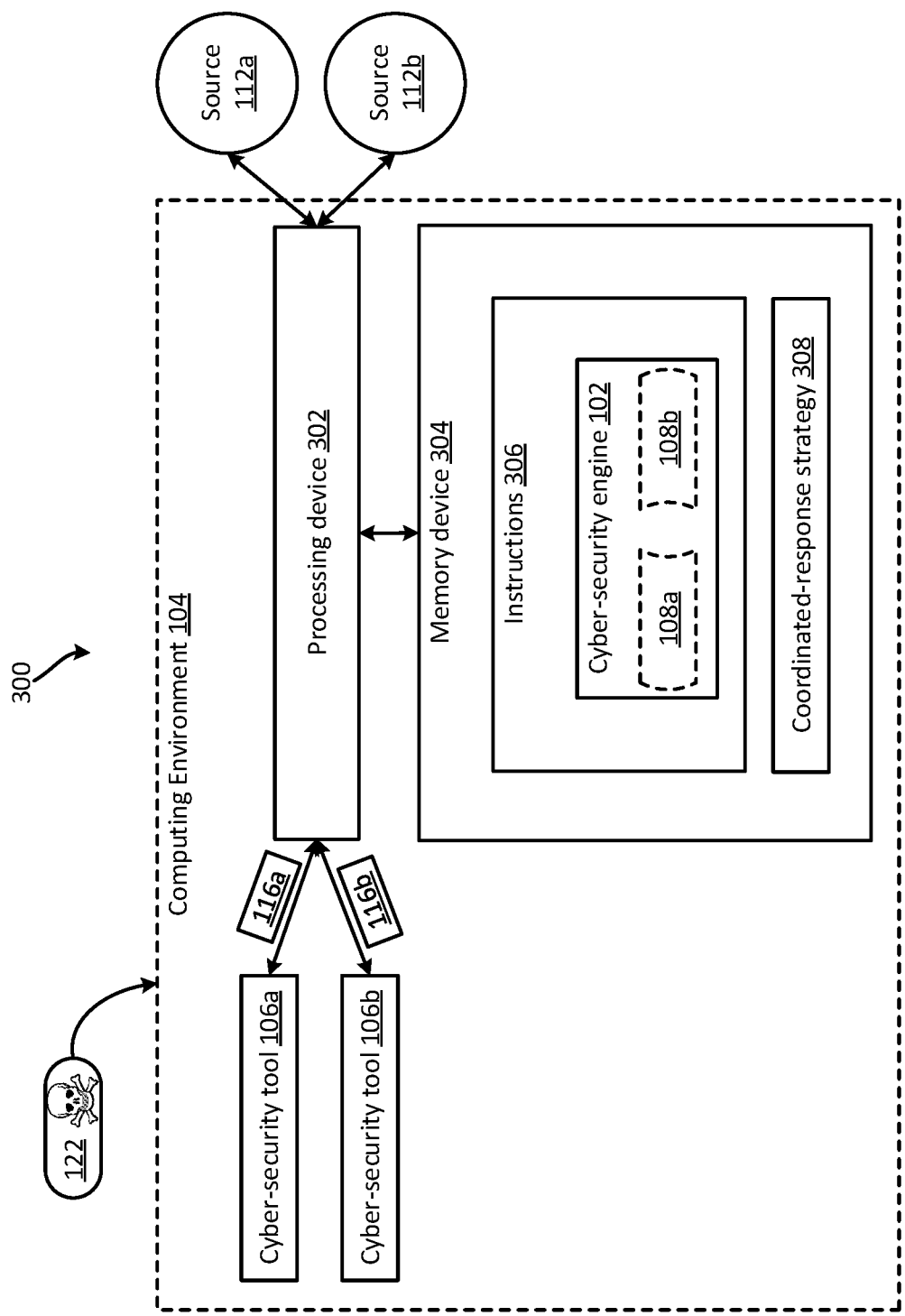
FIG. 3 is a block diagram of still another example of a system for mitigating cyber-attacks by automatically coordinating responses from cyber-security tools according to some aspects.

FIG. 3 is a block diagram of still another example of a system 300 for mitigating cyber-attacks by automatically coordinating responses from cyber-security tools 106a-b according to some aspects. The system 300 includes a processing device 302 communicatively coupled to a memory device 304. In some examples, the processing device 302 and the memory device 304 can be housed in a single device, such as a computing device. In other examples, the processing device 302 and the memory device 304 can be distributed from one another.

The processing device 302 can include one processing device or multiple processing devices. Non-limiting examples of the processing device 302 include a Field-Programmable Gate Array (FPGA), an application-specific integrated circuit (ASIC), a microprocessor, etc. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, etc.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EEPROM), flash memory, or any other type of non-volatile memory. In some examples, at least some of the memory device can include a medium from which the processing device 302 can read instructions 306. In some examples, the instructions 306 can be for a cyber-security engine 102. The cyber-security engine 102 can include one or more software modules 108a-b created by various sources 112a-b. In some examples, the memory device 304 can include a non-transitory computer-readable medium. A computer-readable medium can include electronic, optical, magnetic, or other storage devices capable of providing the processing device 302 with computer-readable instructions or other program code. Examples of a computer-readable medium include magnetic disk(s), memory chip(s), ROM, random-access memory (RAM), an ASIC, a configured processor, optical storage, or any other medium from which a computer processor can read the instructions 306.

The processing device 302 can obtain the software modules 108a-b (e.g., from the sources 112a-b) and configure the software modules 108a-b for use with the cyber-security engine 102. This can involve installing the software modules 108a-b or integrating the software modules 108a-b into the cyber-security engine 102. The processing device 302 may then be able to communicate with the cyber-security tools 106a-b. The processing device 302 can communicate with the cyber-security tools 106a-b and, using the cyber-security engine 102, to detect one or more events indicative of a cyber-attack 122 against a computing environment 104. In response to detecting the one or more events indicative of a cyber-attack 122, the processing device 302 can use the cyber-security engine 102 to determine a coordinated-response strategy 308 for mitigating the cyber-attack 122. The processing device 302 can then implement the coordinated-response strategy 307 by transmitting commands 116a-b to the cyber-security tools 106a-b.

Figure 4:
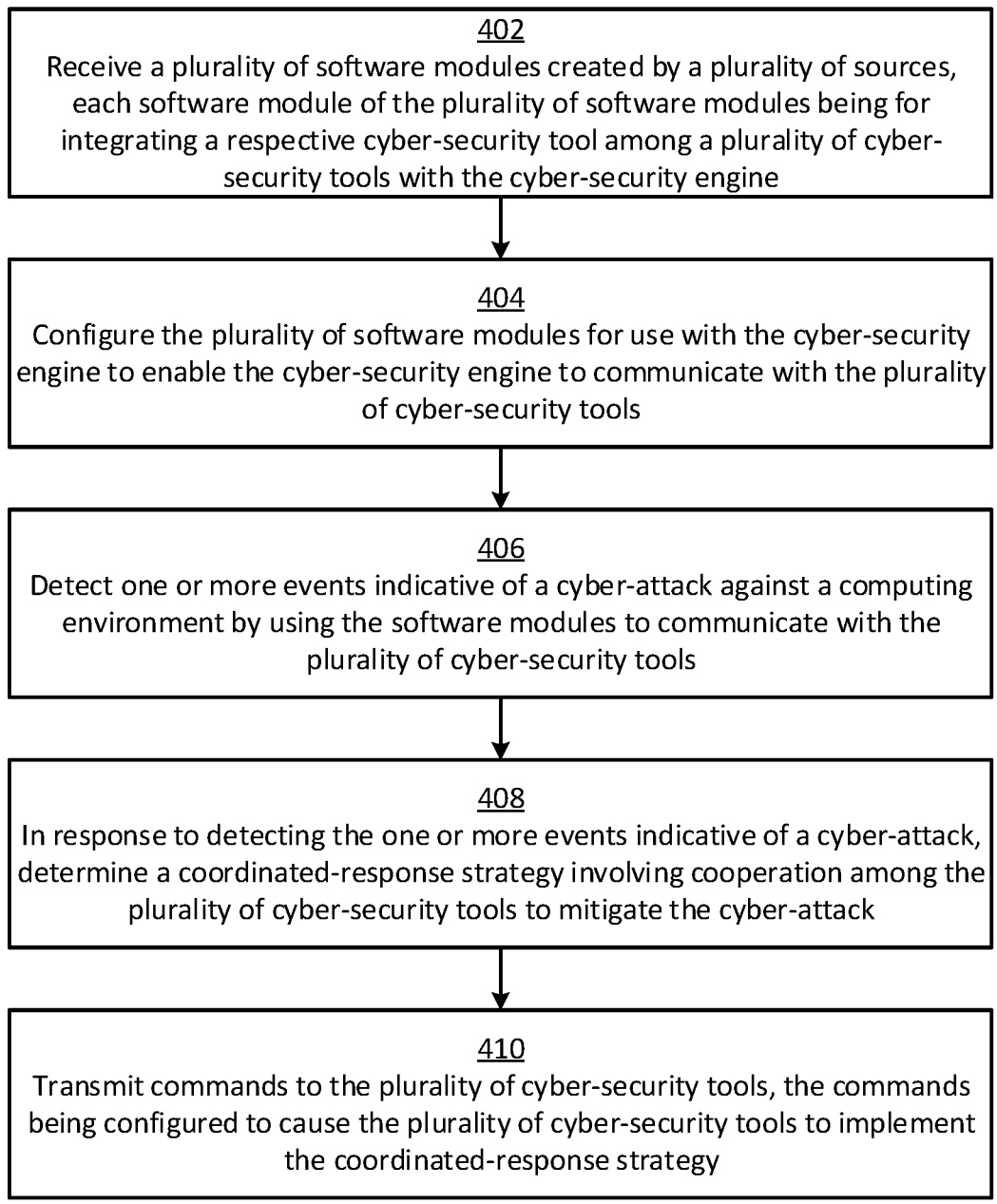
FIG. 4 is a flow chart of an example of a process for mitigating cyber-attacks by automatically coordinating responses from cyber-security tools according to some aspects.

FIG. 4 is a flow chart of an example of a process for mitigating cyber-attacks by automatically coordinating responses from cyber-security tools according to some aspects. Other examples can include more steps, fewer steps, different steps, or a different order of the steps than are depicted in FIG. 4. The steps of FIG. 4 are described with reference to the components discussed above with regard to FIG. 3.

In block 402, a processing device 302 receives multiple software modules 108a-b created by multiple sources 112a-b. Each software module can be for integrating a respective cyber-security tool among multiple cyber-security tools 106a-b with the cyber-security engine 102. For example, each software module can have computer-executable program code that is specifically designed to work with an API of a particular cyber-security tool. The processing device 302 can receive the software modules 108a-b from a central repository, directly or indirectly from the sources 112a-b, etc.

In block 404, the processing device 302 configures the multiple software modules 108a-b for use with the cyber-security engine 102 to enable the cyber-security engine 102 to communicate with the multiple cyber-security tools 106a-b. Configuring the software modules 108a-b can involve installing the software modules 108a-b, setting one or more flags or adjusting one or more parameters in the cyber-security engine 102, storing the software modules 108a-b at a particular location in a filesystem, or any combination of these.

In block 406, the processing device 302 detects one or more events indicative of a cyber-attack 122 against a computing environment 104 using the multiple software modules 108a-b to communicate with the multiple cyber-security tools 106a-b. For example, the processing device 302 can receive communications (e.g., alerts or notifications) from the cyber-security tools 106a-b. The processing device 302 can then use the software modules 108a-b to translate the communications into a format that is capable of being analyzed using the cyber-security engine 102. The processing device 302 can then use the cyber-security engine 102 (e.g., a machine-learning model or database of the cyber-security engine 102) to analyze the translated communications and thereby determine that translated communications indicate the one or more events.

In block 408, the processing device 302 determines a coordinated-response strategy 308 in response to detecting the one or more events indicative of the cyber-attack 122. The coordinated-response strategy 308 can involve cooperation among the cyber-security tools 106a-b to mitigate the cyber-attack 122. In some examples, the processing device 302 can use a database, a machine-learning model, rules, or any combination of these to determine the coordinated-response strategy 308. The processing device 302 may determine the coordinated-response strategy 308 based on the computing-environment characteristics, the cyber-attack characteristics, or both.

In some examples, determining the coordinated-response strategy 308 can involve selecting a particular cyber-security tool 106a to perform a mitigation operation from among several cyber-security tools 106a-b that are capable of performing the mitigation operation. For example, the computing environment 104 can have three cyber-security tools that are all antivirus software. Each piece of antivirus software can generally have a different purpose, but they may all be capable of erasing a particular type of virus. If the cyber-attack 122 involves the particular type of virus, part of determining the coordinated-response strategy 308 can involve selecting which of the pieces of antivirus software to use to erase the virus. In some examples, the processing device 302 can compare cyber-security tools 106a-b capable of performing a mitigation operation to determine which cyber-security tool can perform the mitigation operation in a superior manner (e.g., according to one or more predefined criteria). The processing device 302 can then select the superior cyber-security tool to perform the mitigation operation as part of the coordinated-response strategy. For example, the processing device 302 can determine that the cyber-security tool 106a can erase the particular type of virus faster, using less memory, using less processing power, or any combination of these, than the other cyber-security tool 106b. So, the processing device 302 can select the cyber-security tool 106a to erase the virus as part of the coordinated-response strategy.

In block 410, the processing device 302 transmits commands 116a-b to the multiple cyber-security tools 106a-b. The commands 116a-b can be configured to cause the cyber-security tools 106a-b to implement the coordinated-response strategy 308. For example, each command can cause a cyber-security tool to implement one or more mitigation operations to combat at least a portion of the cyber-attack 112. The commands 116a-b can be in any suitable format that is interpretable by the cyber-security tools 106a-b.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. And the examples disclosed herein can be combined or rearranged to yield additional examples.

The invention claimed is:

1. A system comprising:
a processing device; and
a memory device including instructions for a cyber-security engine, the instructions being executable by the processing device for causing the processing device to:
receive a plurality of software modules created by a plurality of sources, each software module of the plurality of software modules being for integrating a respective cyber-security tool among a plurality of cyber-security tools with the cyber-security engine;
configure the plurality of software modules for use with the cyber-security engine to enable the cyber-security engine to communicate with the plurality of cyber-security tools;
detect one or more events indicative of a cyber-attack against a computing environment by using the plurality of software modules to communicate with the plurality of cyber-security tools;
in response to detecting the one or more events indicative of a cyber-attack, determine a coordinated-response strategy involving cooperation among the plurality of cyber-security tools to mitigate the cyber-attack; and
transmit commands to the plurality of cyber-security tools, the commands being configured to cause the plurality of cyber-security tools to implement the coordinated-response strategy.

2. The system of claim 1, wherein:
each source of the plurality of sources is a company that is different from the other sources in the plurality of sources;
the plurality of software modules are programmed in a common programming language; and
the memory device further includes instructions that are executable by the processing device for causing the processing device to receive the plurality of software modules by downloading the plurality of software modules from a centralized repository via the Internet.

3. The system of claim 1, wherein the memory device further includes instructions that are executable by the processing device for causing the processing device to determine the coordinated-response strategy by using a machine-learning model that is configured to analyze characteristics of the cyber-attack and select the coordinated-response strategy from among a plurality of coordinated-response strategies based on the characteristics of the cyber-attack.

4. The system of claim 3, wherein the memory device further includes instructions that are executable by the processing device for causing the processing device to:
determine that a first response-strategy was previously applied by a first cyber-security engine to mitigate the cyber-attack by communicating with the first cyber-security engine;
determine that a second response-strategy was previously applied by a second cyber-security engine to mitigate the cyber-attack by communicating with the second cyber-security engine;
determine that the first response-strategy is superior to the second response-strategy according to at least one predefined criterion; and
based on determining that the first response-strategy is superior to the second response-strategy, train the machine-learning model to select the first response-strategy as the coordinated-response strategy rather than the second response-strategy.

5. The system of claim 4, wherein the first cyber-security engine is for protecting a first network, and the second cyber-security engine is for protecting a second network that is different from the first network.

6. The system of claim 3, wherein the memory device further includes instructions that are executable by the processing device for causing the processing device to train the machine-learning model by iteratively:
using the machine-learning model to analyze a particular cyber-attack and determine a candidate response-strategy for mitigating the particular cyber-attack;
displaying information about the candidate response-strategy to a user via a display device;
receiving user input indicating whether the candidate response-strategy is acceptable or unacceptable; and
configuring one or more parameters of the machine-learning model in response to the user input.

7. The system of claim 1, wherein the plurality of cyber-security tools include a firewall and an intrusion detection system (IDS), and wherein each cyber-security tool in the plurality of cyber-security tools has an application programming interface (API) for enabling integration with the cyber-security engine via the plurality of software modules.

8. The system of claim 1, wherein:
the plurality of cyber-security tools includes (i) a first cyber-security tool capable of performing a mitigation operation for at least partially mitigating the cyber-attack, and (ii) a second cyber-security tool capable of performing the mitigation operation; and
the memory device further includes instructions that are executable by the processing device for causing the processing device to determine the coordinated-response strategy by:
determining that the first cyber-security tool is capable of performing the mitigation operation in a superior manner to the second cyber-security tool according to a predefined criterion; and
in response to determining that the first cyber-security tool is capable of performing the mitigation operation in the super manner, selecting the first cyber-security tool for performing the mitigation operation as part of the coordinated-response strategy.

9. A method comprising:
receiving, by a processing device, a plurality of software modules created by a plurality of sources, each software module of the plurality of software modules being for integrating a respective cyber-security tool among a plurality of cyber-security tools with a cyber-security engine;
configuring, by the processing device, the plurality of software modules for use with the cyber-security engine to enable the cyber-security engine to communicate with the plurality of cyber-security tools;
detecting, by the processing device, one or more events indicative of a cyber-attack against a computing environment by using the the plurality of software modules to communicate with the plurality of cyber-security tools;
in response to detecting the one or more events indicative of a cyber-attack, determining, by the processing device, a coordinated-response strategy involving cooperation among the plurality of cyber-security tools to mitigate the cyber-attack; and
transmitting, by the processing device, commands to the plurality of cyber-security tools, the commands being configured to cause the plurality of cyber-security tools to implement the coordinated-response strategy.

10. The method of claim 9, wherein:
each source of the plurality of sources is a company that is different from the other sources in the plurality of sources;
the plurality of software modules are programmed in a common programming language; and
further comprising receiving the plurality of software modules by downloading the plurality of software modules from a centralized repository via the Internet.

11. The method of claim 9, further comprising determining the coordinated-response strategy by using a machine-learning model that is configured to analyze characteristics of the cyber-attack and select the coordinated-response strategy from among a plurality of coordinated-response strategies based on the characteristics of the cyber-attack.

12. The method of claim 9, further comprising:
determining that a first response-strategy was previously applied by a first cyber-security engine to mitigate the cyber-attack by communicating with the first cyber-security engine;
determining that a second response-strategy was previously applied by a second cyber-security engine to mitigate the cyber-attack by communicating with the second cyber-security engine;
determining that the first response-strategy is superior to the second response-strategy according to at least one predefined criterion; and
based on determining that the first response-strategy is superior to the second response-strategy, training a machine-learning model to select the first response-strategy as the coordinated-response strategy rather than the second response-strategy.

13. The method of claim 12, wherein the first cyber-security engine is for protecting a first network, and the second cyber-security engine is for protecting a second network that is different from the first network.

14. The method of claim 9, wherein:
the plurality of cyber-security tools includes (i) a first cyber-security tool capable of performing a mitigation operation for at least partially mitigating the cyber-attack, and (ii) a second cyber-security tool capable of performing the mitigation operation; and
further comprising determining the coordinated-response strategy by:
determining that the first cyber-security tool is capable of performing the mitigation operation in a superior manner to the second cyber-security tool according to a predefined criterion; and
in response to determining that the first cyber-security tool is capable of performing the mitigation operation in the super manner, selecting the first cyber-security tool for performing the mitigation operation as part of the coordinated-response strategy.

15. A non-transitory computer-readable medium comprising program code that is executable by a processing device for causing the processing device to:
receive a plurality of software modules created by a plurality of sources, each software module of the plurality of software modules being for integrating a respective cyber-security tool among a plurality of cyber-security tools with a cyber-security engine;
configure the plurality of software modules for use with the cyber-security engine to enable the cyber-security engine to communicate with the plurality of cyber-security tools;
detect one or more events indicative of a cyber-attack against a computing environment by using the the plurality of software modules to communicate with the plurality of cyber-security tools;

in response to detecting the one or more events indicative of a cyber-attack, determine a coordinated-response strategy involving cooperation among the plurality of cyber-security tools to mitigate the cyber-attack; and transmit commands to the plurality of cyber-security tools, the commands being configured to cause the plurality of cyber-security tools to implement the coordinated-response strategy.

16. The non-transitory computer-readable medium of claim 15, wherein:

each source of the plurality of sources is a company that is different from the other sources in the plurality of sources;

the plurality of software modules are programmed in a common programming language; and further comprising program code that is executable by the processing device for causing the processing device to receive the plurality of software modules by downloading the plurality of software modules from a centralized repository via the Internet.

17. The non-transitory computer-readable medium of claim 15, further comprising program code that is executable by the processing device for causing the processing device to determine the coordinated-response strategy by using a machine-learning model that is configured to analyze characteristics of the cyber-attack and select the coordinated-response strategy from among a plurality of coordinated-response strategies based on the characteristics of the cyber-attack.

18. The non-transitory computer-readable medium of claim 15, further comprising program code that is executable by the processing device for causing the processing device to:

determine that a first response-strategy was previously applied by a first cyber-security engine to mitigate the cyber-attack by communicating with the first cyber-security engine;

determine that a second response-strategy was previously applied by a second cyber-security engine to mitigate the cyber-attack by communicating with the second cyber-security engine;

determine that the first response-strategy is superior to the second response-strategy according to at least one predefined criterion; and based on determining that the first response-strategy is superior to the second response-strategy, train a machine-learning model to select the first response-strategy as the coordinated-response strategy rather than the second response-strategy.

19. The non-transitory computer-readable medium of claim 18, wherein the first cyber-security engine is for protecting a first network, and the second cyber-security engine is for protecting a second network that is different from the first network.

20. The non-transitory computer-readable medium of claim 15, wherein:

the plurality of cyber-security tools includes (i) a first cyber-security tool capable of performing a mitigation operation for at least partially mitigating the cyber-attack, and (ii) a second cyber-security tool capable of performing the mitigation operation; and further comprising program code that is executable by the processing device for causing the processing device to determine the coordinated-response strategy by:

determining that the first cyber-security tool is capable of performing the mitigation operation in a superior manner to the second cyber-security tool according to a predefined criterion; and in response to determining that the first cyber-security tool is capable of performing the mitigation operation in the super manner, selecting the first cyber-security tool for performing the mitigation operation as part of the coordinated-response strategy.

* * * * *